United States Patent [19]

Tieman

[11] Patent Number: 4,813,027

[45] Date of Patent: Mar. 14, 1989

[54] METHOD AND APPARATUS FOR ENHANCING SEISMIC DATA

[75] Inventor: Hans Tieman, Dhahran, Saudi Arabia

[73] Assignee: Arabian American Oil Company, Dhahran, Saudi Arabia

[21] Appl. No.: 74,698

[22] Filed: Jul. 17, 1987

[51] Int. Cl.$^4$ .............................................. G01V 1/36
[52] U.S. Cl. ..................................... 367/52; 364/421
[58] Field of Search ...................... 367/38, 50, 51, 52, 367/53, 54, 62; 364/421

[56] References Cited

U.S. PATENT DOCUMENTS

| | | | |
|---|---|---|---|
| 3,196,385 | 7/1965 | Smith | 346/33 C |
| 3,284,763 | 11/1966 | Bratton | 367/55 |
| 3,460,065 | 8/1969 | Forester et al. | 367/50 |
| 3,550,074 | 12/1970 | Kerns et al. | 367/42 |
| 3,622,967 | 11/1971 | Foster et al. | 367/42 |
| 3,646,509 | 2/1972 | Hughes et al. | 367/60 |
| 3,813,784 | 6/1974 | Gillig et al. | 33/1 HH |
| 4,204,278 | 5/1980 | Nelson | 367/39 |
| 4,206,509 | 6/1980 | Ruehle | 367/42 |
| 4,208,732 | 6/1980 | Ruehle | 367/42 |
| 4,298,966 | 11/1981 | Ruehle | 367/50 |
| 4,330,872 | 5/1982 | Bratton | 367/43 |
| 4,503,527 | 3/1985 | Pann | 367/53 |
| 4,567,582 | 1/1986 | Kuhn | 367/56 |

OTHER PUBLICATIONS

Abstracts of the articles by Savic, Savic et al., (attachment).

Shugart, T. R., "Optimum Weights Improve Stack Quality," Oil and Gas Journal, Nov. 27, 1972.

Naess et al., "Stacking Methods Other Than Simple Summation," Chapter 6, Developments in Geophysical Explor. Methods.

Savic, M., Simpson, A. L., McDonald, J. A. and Gardner, G. H. F., "Minimum Error Zero Offset Traveltime Method of NMO Velocity Estimate", 49th European Assoc. of Expl. Geophys. (Belgrade, Yugo., 87.06.09–12), 1987.

Taner, M. T., and Koehler, F., "Velocity Spectra–Digital Computer Derivation and Applications of Velocity Functions", Geophysics, vol. 34, (Dec. 1969), pp. 859–881.

Green, C. H., "Velocity Determination by Means of Reflection Profiles", Geophysics, vol. 3, (Oct. 1938), pp. 295–305.

Dix, C. H., "Seismic Velocities from Surface Measurements", Geophysics, vol. 20, (Jan. 1955), pp. 68–86.

(List continued on next page.)

Primary Examiner—Thomas H. Tarcza
Assistant Examiner—Ian J. Lobo
Attorney, Agent, or Firm—Davis Hoxie Faithfull & Hapgood

[57] ABSTRACT

A method and apparatus for stacking a plurality of seismic midpoint gathers to provide an enhanced pictorial representation of seismic events is disclosed. The approximate propagation velocity corresponding to a selected event in a common midpoint gather, is determined by summing the common midpoint gather using first and second weights to provide respective first and second weighted sums over offset based on an estimated velocity corresponding to the event, and developing from the sums a velocity error value indicative of the approximate error between the estimated velocity and the actual velocity. The common midpoint gather is then re-stacked in accordance with the determined propagation velocity to provide an enhanced pictorial representation of the seismic event. The first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, the velocty error value is determined as a function of the deviation of the peak of the crosscorrelation of the first and second weighted sums from the center of the time window.

34 Claims, 9 Drawing Sheets

OTHER PUBLICATIONS

Sherwood, J. W. C., Chen, K. C., and Wood, M., "Depths and Interval Velocities from Seismic Reflection Data for Low Relief Structures", presented at the 18th Annual OTC (Offshore Technology Conference), Houston, 1986.

Garotta, R., and Michon, D., "Continuous Analysis of the Velocity Function and of the Move Out Corrections", *Geophysical Prospecting*, vol. 15, (Dec. 1967), pp. 584–597.

Neidell, N. S., and Taner, M. T., "Semblance and Other Coherency Measure for Multichannel Data", *Geophysics*, vol. 36, (Jun. 1971), pp. 482–497.

Beitzel, J. E., and Davis, J. M., "A Computer Oriented Velocity Analysis Interpretation Technique", *Geophysics*, vol. 39, (Oct. 1974), pp. 619–632.

Blackburn, G., "Errors in Stacking Velocity—True Velocity Conversion Over Complex Geologic Situations", *Geophysics*, vol. 45, (Oct. 1980, pp. 1465–1488.

Schultz, P. S., "A Method for Direct Estimation of Interval Velocities", *Geophysics*, vol. 47, (Dec. 1982), pp. 1657–1671.

Carrion, P. M., and Kuo, J. T., "A Method for Computation of Velocity Profiles by Inversion of Large-Offset Records", *Geophysics*, vol. 49, (Aug. 1984), pp. 1249–1258.

Kirlin, R. L., Dewey, L. A., and Bradley, J. N., "Optimum Seismic Velocity Estimators", *Geophysics*, vol. 4933, (Nov. 1984), pp. 1861–1868.

Schneider, W. A., and Backus, M., "Dynamic Correlation Analysis", *Geophysics*, vol. 33, (Feb. 1968), pp. 105–126.

Khattri, K., Vig, P. K., and Rao, N. D. J., "An Optimized Technique for Determining Stacking Velocity from Seismic Reflection Data", *Geophysical Prospecting*, vol. 29, (Dec. 1980), pp. 825–839.

Kirlin, R. L. and Bradley, J. N., "Delay Estimation Simulation and a Normalized Comparison of Published Results", *IEEE Transactions on Acoustics, Speech, and Signal Processing*, vol. ASSP-30, No. 3, (Jun. 1982), pp. 508–511.

Hubral, P., and Krey, T., *Interval Velocities from Seismic Reflection Time Measurements* (Soc. Expl. Geophys., 1980).

Garotta, R., "Long Wavelength Statics through Partial Common Midpoint Stacks", Technical Series No. 559.86.09, (Compagnie Generale de Geophysique), 1987.

METHOD AND APPARATUS FOR ENHANCING SEISMIC DATA

FIELD OF THE INVENTION

The present invention relates to the field of seismic prospecting, and in particular, the field of seismic signal processing for producing a pictorial representation of subsurface formations.

BACKGROUND OF THE INVENTION

One well-known technique of seismic prospecting involves the placement of a linear array of geophones along the surface of the earth, or a body of water, producing a "shot", or source of seismic signals, through the use of an explosive charge or vibratory stimulus, and receiving signals reflected from the subsurface formations, or seismic "events", at each of the geophones in the linear array. The locations of the geophones and the signal source are then moved, in a well known manner, and the process is repeated. In this way, raw data in the form of a plurality of "common shot gathers" are collected along a seismic line of interest.

To analyze the raw data the data is gain-adjusted in a well-known manner to remove the influence of distance between various source and receiver pairs, and deconvolved to produce a relatively narrow pulse in response to each seismic event. The geometry of the common shot gathers is also converted in a well-known way to a plurality of "common midpoint gathers", one of which is illustrated in FIG. 1. The common midpoint gather is defined as those source and receiver pairs which have a common midpoint. In FIG. 1, $S_i$ denotes the source location, $R_i$ denotes the associated receiver location, x is the source-receiver offset, equal to $R_i-S_i$, and the common midpoint value is defined as $(R_i+S_i)/2$. The formula relating travel time of the seismic signal from the source $S_i(x)$ to the receiver $R_i(x)$ is given by $v^2t^2(x)=x^2+4d^2$, where v is velocity of propagation, t is travel time, and d is the distance from zero offset (x=0) to the seismic reflection. By defining $2d=vt(0)$, $t(0)$ being the travel time of a signal from source $S_0$ to colocated receiver $R_0$, the following formula results:

$$v^2t^2(x)=x^2+v^2t^2(0).$$

This formula, which defines the normal moveout relationship, is the most commonly used method of determining the signal arrival time differences of seismic data as a function of the offset distance of receiver from the source. The normal moveout relationship is hyperbolic between offset x and time t(x).

It is well known in the art that common midpoint data are noisy to the point where t(x) cannot be measured directly, and in order to reveal the unknown velocity v, corresponding to a particular event, a velocity analysis must be undertaken. Furthermore, since the velocity varies with both depth d, and position x, many such velocity analyses must be performed along the seismic line of interest to establish these variations. Clearly, the amount of time required to perform each analysis will greatly impact the time required to analyze an entire line.

Heretofore, each velocity analysis has been performed in accordance with a technique such as that proposed by Tanner and Koehler, in "Velocity Spectra-Digital Computer Derivation and Applications of Velocity Functions", *Geophysics*, v. 34, pp. 859–899 (1969), as follows: A set of trial velocities are used to "stack" the data, and then either a manual or automatic search is made to determine that velocity which gives the best response to a particular event. This is explained with reference to FIGS. 2–4. FIG. 2 illustrates common midpoint seismic data, which for the purposes of simplicity of explanation, is a noise-free single event, shown as a function of offset x and time t. In FIG. 2, the seismic "wavelet" corresponding to the event is shown as having a normal hyperbolic moveout relationship as defined above. The prior art method of velocity analysis is to "correct" the data with a suite of velocities, "stack" the data for each such velocity, and examine the result of the stacked data, choosing the velocity that results in the stack of highest amplitude. The assumption is that the highest amplitude is produced by the closest velocity.

With reference to FIGS. 3A and 3B, a first trail velocity is chosen and the data is corrected, i.e. the effect of the normal moveout relationship is removed, making each recording at the various shotreceiver offsets look like they were recorded at x=0. This is done by shifting the collection of seismic wavelets up in time using the normal moveout relationship and the estimated trial velocity, as graphically illustrated in FIG. 3A. The shifted wavelets are then summed along offset x to produce summed trace or stack 2, FIG. 3B.

FIG. 4 shows the shifted common midpoint data using a more correct estimate of velocity, resulting in a stack 4 having a higher amplitude.

Having determined the velocity, for a particular event, within a reasonable tolerance, the stack of the common midpoint gather, or "zero offset trace" is used to portray the associated seismic event in pictorial form, an example of which will be referred to below. The stacked data is so used since the individual reflection signals are usually too noisy to accurately portray useful information. By stacking the common midpoint gathers using a good velocity estimate, the step of summing greatly enhances the information, by increasing the signal-to-noise ratio. The closer the velocity used to stack the data is to the actual velocity, the better the enhancement of the information will be.

It will be appreciated that the traditional processing technique described above requires that each set of common midpoint data be stacked using a relatively large number of trial velocities depending upon the required tolerance in the velocity estimate, and any a priori knowledge of the propagation velocity at nearby or similar formations. Moreover, it will be appreciated that the stack is not performed using the exact (within tolerance) velocity required, but is rather based on an interpolation using the suite of trial velocities.

OBJECTS AND SUMMARY OF THE INVENTION

It is therefore an object of the present invention to overcome the shortcomings of prior art seismic processing techniques.

It is a further object of the present invention to provide a new seismic processing technique which is more rapid and accurate than prior art techniques.

It is a further object of the present invention to provide a new seismic processing technique to enhance the pictorial representation of common midpoint stack data.

It is a further object of the present invention to provide a seismic processing technique for enhancing the pictorial representation of seismic data in which seismic events are more accurately portrayed.

It is a further object of the present invention to provide an improved technique for pictorially representing seismic events at locations substantially corresponding to their actual locations.

In accordance with a first aspect of the present invention, a method for stacking a plurality of seismic midpoint gathers, to provide an enhanced pictorial representation of seismic events, includes the steps of providing a common midpoint gather, determining the approximate propagation velocity corresponding to a selected event, based on the common midpoint gather, by summing the common midpoint gather using first and second weights to provide respective first and second weighted sums over offset, based on an estimated velocity corresponding to the event, and developing from the sums a velocity error value indicative of the approximate error between the estimated velocity and the actual velocity. The common midpoint gather is then re-stacked in accordance with the determined propagation velocity to thereby provide an enhanced pictorial representation of the seismic event. More specifically, the first and second weighted sums are taken over a time window centered upon an estimated zero offset travel time for the event. The first and second weights can be selected to provide rapid, slow or intermediate convergence upon the true velocity. The velocity error value is determined as a function of the deviation of the peak of the first weighted sum from the center of the time window, relative to the deviation of the peak of the second weighted sum from the center of the time window. Alternatively, and in accordance with the preferred embodiment, the velocity error value is determined as a function of the deviation of the peak of the crosscorrelation of the first and second weighted sums from the center of the time window.

Additionally, an update zero offset travel time can be determined by developing from the first and second sums a time error value indicative of the approximate error between the estimated zero offset the travel time and the actual zero offset travel time.

Furthermore, the propagation velocity, as determined above, (also referred to as "apparent RMS velocity" or "stacking velocity" versus time) can be converted to "true interval velocity" versus depth, or "true average velocity" versus time. The re-stacked common midpoint gather may then be converted, in accordance with the true interval velocity, or true average velocity, and zero offset time, into a pictorial representation of the seismic event at a location substantially corresponding to the actual spacial location of the event.

In accordance with another aspect of the present invention, an apparatus for stacking a plurality of seismic midpoint gathers to provide an enhanced pictorial representation of a seismic event, includes a stack processor, summation processor, error processor and feedback means. The stack processor stacks the common midpoint gather which includes the event, using an estimated propagation velocity, to thereby estimate the zero offset travel time for the event. The summation processor sums the common midpoint gather using first and second weights to provide respective first and second weighted sums over offset, using the estimated propagation velocity, over a time window centered upon the estimated zero offset travel time for the event. The error processor responds to the first and second weighted sums, and approximates the error in the estimated propagation velocity, to thereby obtain an updated estimate of the propagation velocity. The feedback means applies the updated estimate of the propagation velocity to the stack processor to thereby restack the common midpoint gather in accordance therewith, to thereby provide an enhanced pictorial representation of the seismic event.

The apparatus may further include iteration means for checking to see whether the approximate error in propagation velocity is greater than a predetermined tolerance, and if so, for applying the updated estimate of propagation velocity to the summation processor, to produce third and fourth weighted sums which are applied to the error processor, to thereby produce a further updated estimate of propagation velocity, for application to the stack processor.

As mentioned in connection with the first aspect of the invention, the summation processor can preferably select the first and second weights to give the apparatus desired convergence properties. The error processor includes means for determining the deviation of the peak of the first weighted sum from the center of the time window, relative to the deviation of the peak of the second weighted sum from the center of the time window, or in accordance with the preferred embodiment, it can crosscorrelate the first and second weighted sums and determine the deviation of the peak of the crosscorrelated sums from the center of the time window.

As also mentioned in connection with the first aspect of the present invention, the error processor may also approximate the error in the estimated zero offset travel time, to produce an updated zero offset travel time, and the feedback means can apply the updated zero offset travel time to the stack processor to thereby restack the common midpoint gather in accordance therewith. Also, the apparatus may include means for converting the velocity, as determined above, into true interval velocity versus depth or true average velocity versus time, and for converting the re-stacked common midpoint gather into a pictorial representation of the seismic event at a location substantially corresponding to the actual spacial location of the event, using the true interval or average velocities, and zero offset times.

BRIEF DESCRIPTION OF THE DRAWINGS

These another objects, aspects and embodiments of the invention will now be described with reference to the following drawing figures of which.

DETAILED DESCRIPTION OF THE INVENTION

Figure 1:
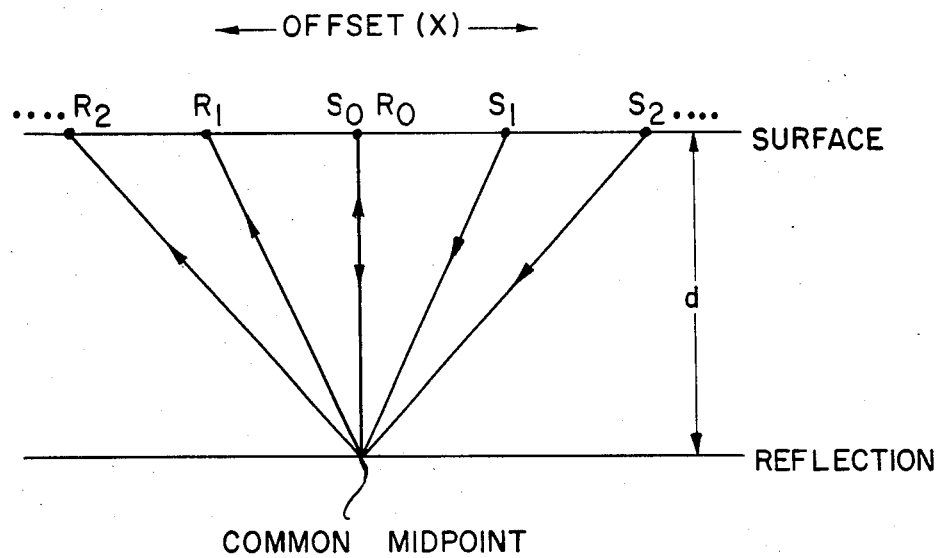
FIG. 1 is an illustration of a common midpoint gather.
Figure 2:
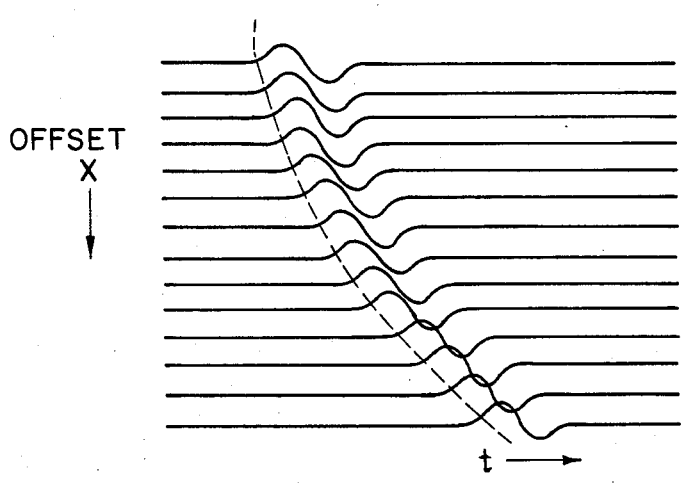
FIG. 2 is an illustration of noise-free common midpoint seismic data for a single event, showing the normal moveout relationship.
Figure 3A:
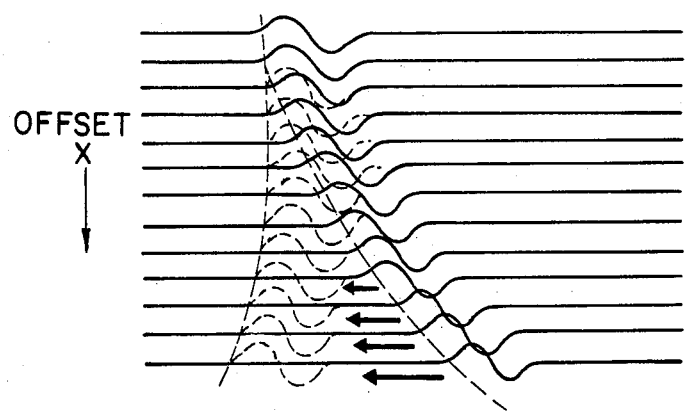
FIG. 3A shows how the seismic data of FIG. 2 is "corrected" in accordance with an estimated velocity.
Figure 3B:
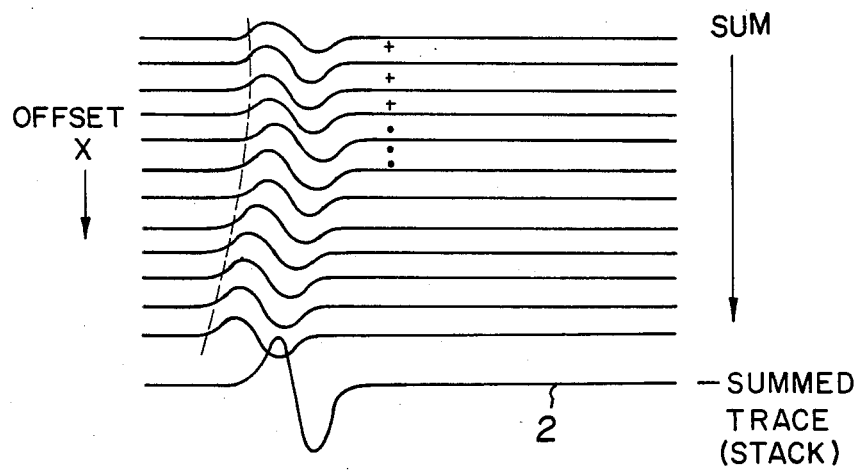
FIG. 3B illustrates the production of a common midpoint stack based on the corrected data of FIG. 3A.
Figure 4:
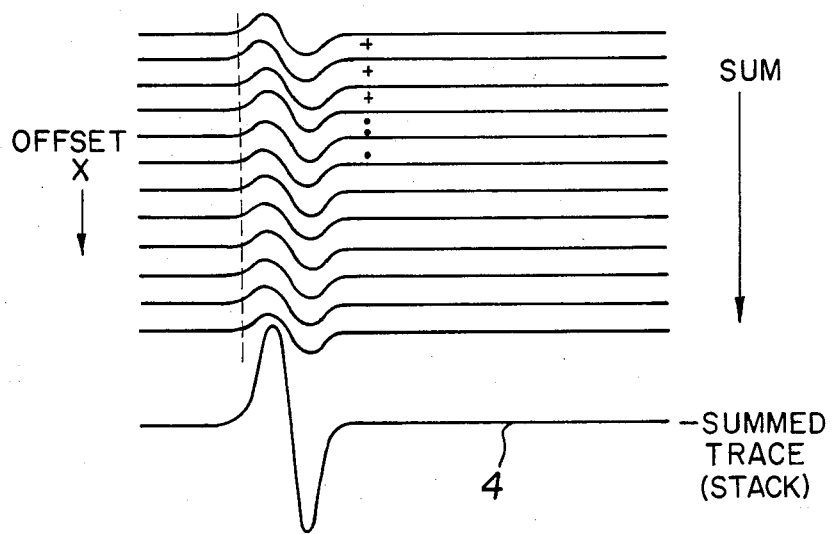
FIG. 4 illustrates the common midpoint stack which is produced when a more accurate estimate of propagation velocity is used.
Figure 5:
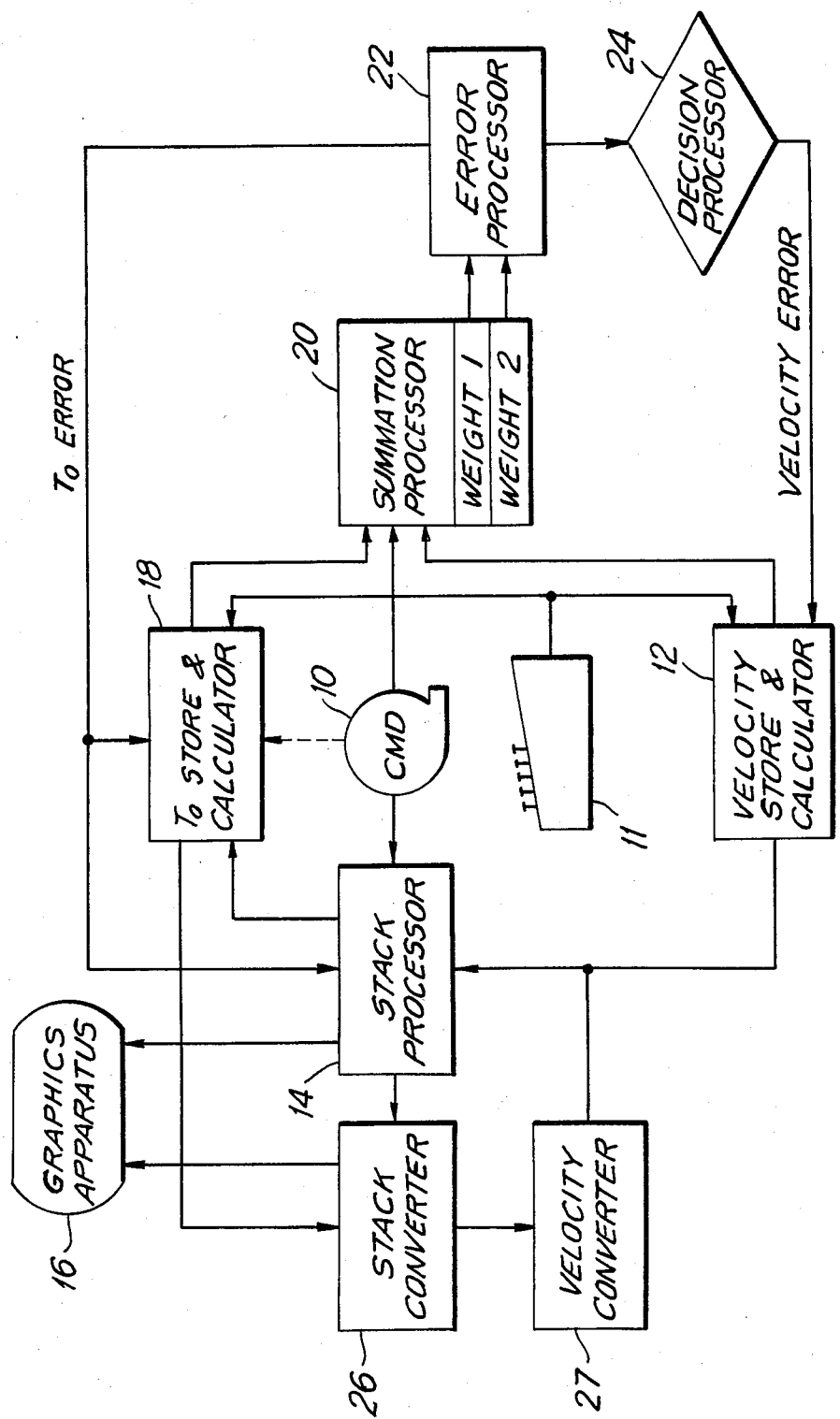
FIG. 5 is an illustration of the apparatus in accordance with the present invention.
Figure 6:
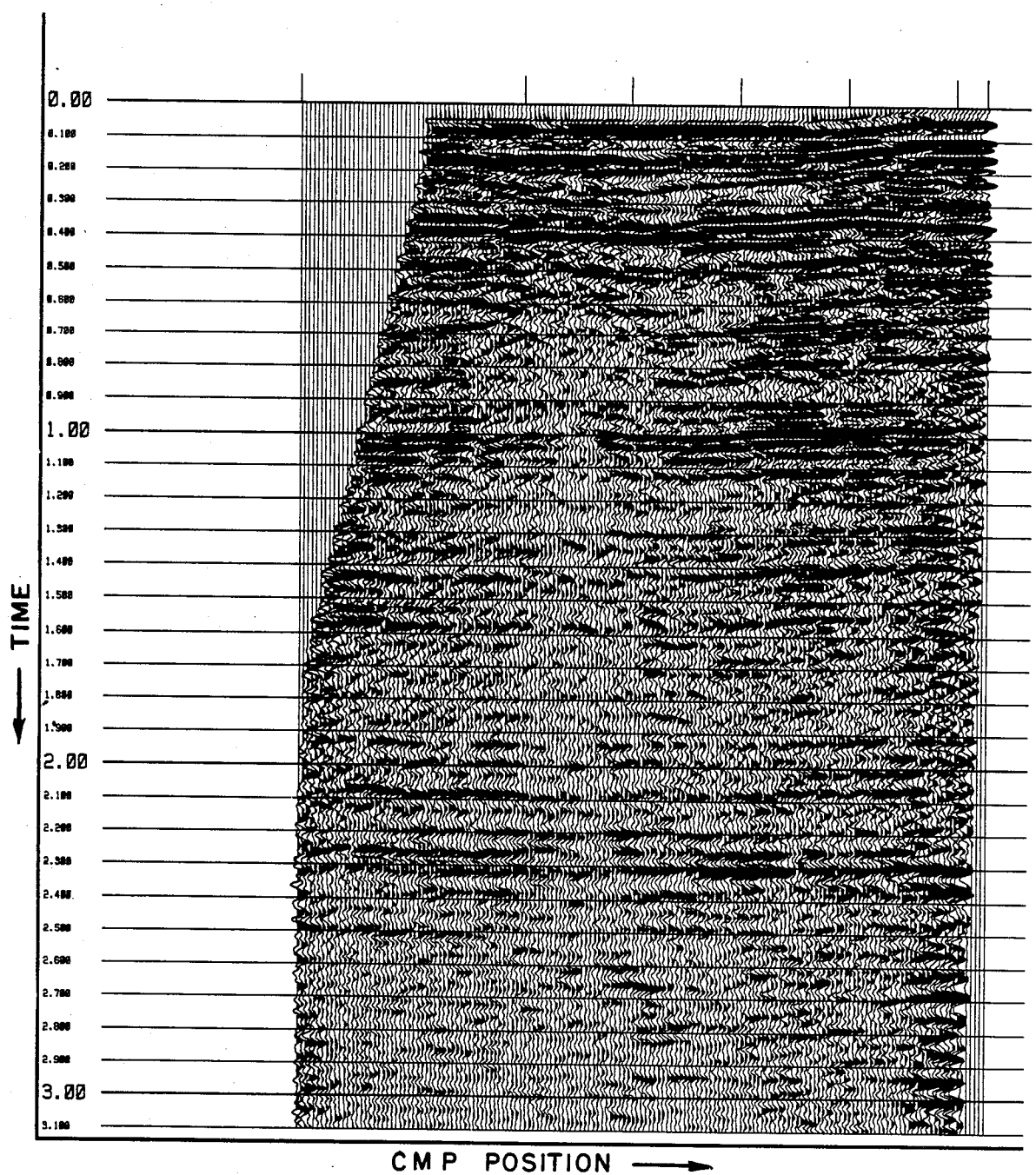
FIG. 6 is an illustration of a set of common midpoint stacks using a rough estimate of velocity.

The principles of the invention will broadly be described with first reference to FIG. 5. Common midpoint data, such as those described with reference to FIG. 1, are provided, for a series of adjacent midpoints along a seismic line under study, on magnetic tape 10 or other suitable data storage device. A velocity estimate, preferably based upon other velocity analyses performed on nearby lines, or from sonic logs taken from a nearby well, or from a reasonable guess, is manually input to the velocity store and calculator 12, by way of keyboard 11, or the like, as shown. Based on this initial velocity estimate, the common midpoint data from tape 10 are stacked in stack processor 14 and the output of the processor 14 is applied to graphics apparatus 16. In this manner, zero-offset traces of the data are produced by apparatus 16, an example of which is illustrated in FIG. 6, wherein each trace along the time axis represents the summed trace, or stack, as shown in FIGS. 3B and 4, of a single common midpoint gather of the type shown in FIG. 1. In FIG. 6, each trace is darkened in a well-known manner by the graphics apparatus as it is deflected along the common midpoint position (or distance) axis, to thereby contrast the seismic events against the background. It will be noted that when the stack processor stacks the midpoint gathers and places adjacent stacks, or zero-offset traces next to one another in the manner shown in FIG. 6, seismic events are pictorially represented in two dimensions, namely along the common midpoint position axis, and in time.

Based upon the set of stacks shown in FIG. 6, produced by graphics apparatus 16, an event or events of interest are selected for further analysis. Based upon the distance of each selected event along the time axis, an estimate of the zero offset time $t_0$, defined as the time at which the event occurs at $x=0$ (time from $S_0$ to $R_0$ in FIG. 1), is made and manually input to $t_0$ store and calculator 18 by way of keyboard 11, or the like. Alternatively, an event can be selected based on the raw common midpoint data, without stacking, and an initial $t_0$ estimated therefrom; this alternative is indicated by the data path, shown in phantom, from the magnetic tape 10 to the $t_0$ store and calculator 18.

Figure 7:
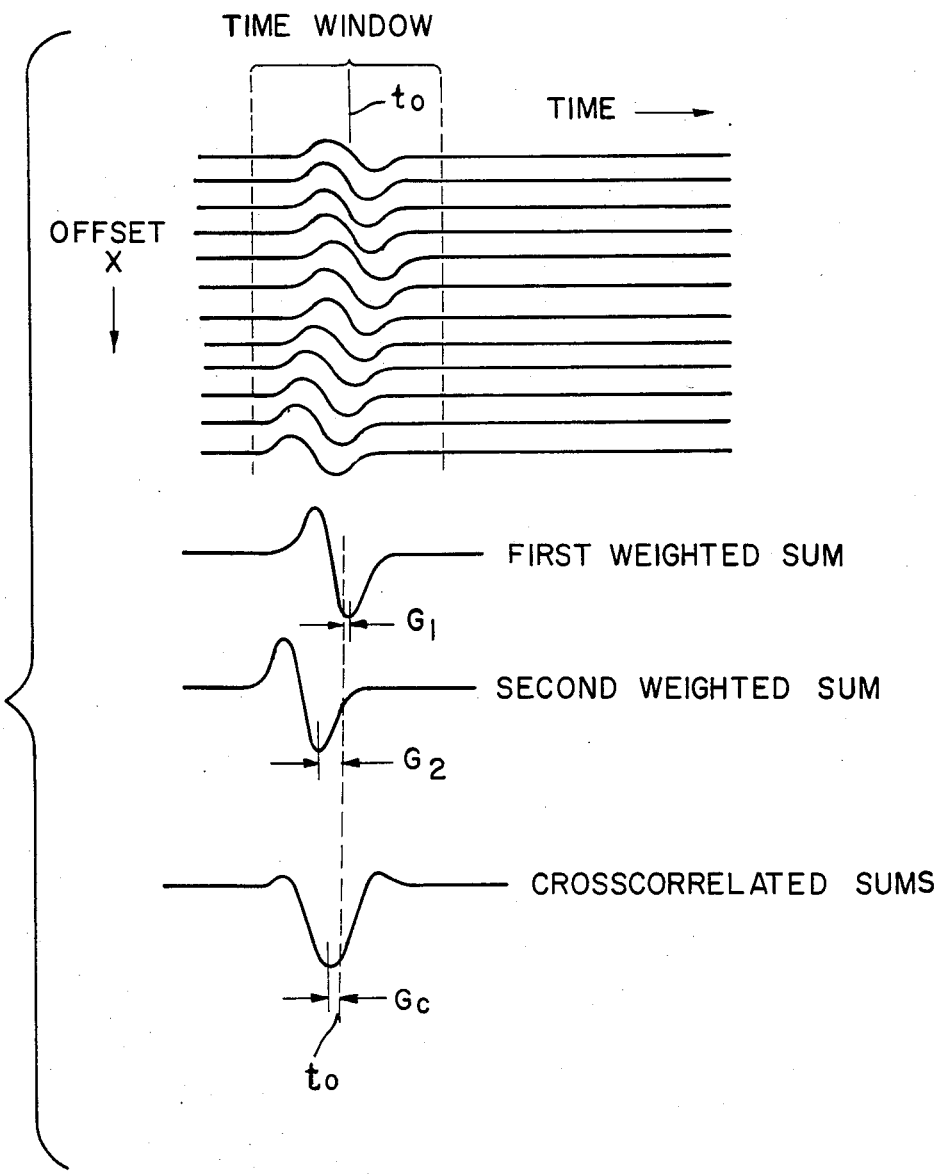
FIG. 7 illustrates the technique for determining the error in the estimated stacking velocity, in accordance with a portion of the present invention.

Having estimated the propagation velocity and zero offset travel time $t_0$, the common midpoint data are applied, along with the velocity and the $t_0$ estimates, to summation processor 20 which functions to produce a pair of weighted sums of the selected common midpoint gather, using the estimated velocity, over a window centered upon the zero offset travel time, as better explained with reference to FIG. 7. As shown in FIG. 7 the selected common midpoint gather, shifted in time based upon an estimated velocity for the selected event, is summed in summation processor 20 over a time window centered upon $t_0$, and two sums are produced. The first sum shown is based on a weighted distribution of the individual traces in the common midpoint gather which weights the close-in traces (small values of offset x) more heavily than, or at least as heavily as, the far-out traces (larger values of offset x). The second weighted sum weights the far-out traces more heavily than the close-in traces. The value $G_1$ is defined as the time deviation between the peak of the first weighted sum from $t_0$, and the value $G_2$ is defined as the time deviation between the peak of the second weighted sum from $t_0$. The magnitude of the value of $G_2-G_1$ is indicative of the error in the velocity used to stack the common midpoint gather. Alternatively, the first and second weighted sums can be crosscorrelated to produce the crosscorrelated sums as shown, and the quantity $G_c$, defined as the time deviation between the peak of the crosscorrelated sums and $t_0$, is indicative of the estimated velocity error. The relationships which yield the velocity error as a function of $G_1$ and $G_2$, or $G_c$, as well as a full mathematical explanation of this principle, are given in detail in Appendix I, below.

The first and second weighted sums are delivered from the summation processor 20 to error processor 22 which calculates the estimated velocity error in accordance with $G_1$ and $G_2$, or in accordance with $G_c$ alone. The use of the crosscorrelated sums is preferred insofar as crosscorrelation by itself produces a signal to noise enhancement. Also, when $G_c$ is used, the maximum amplitude of only a single signal (the crosscorrelated sums) must be picked, thus further facilitating the implementation of this technique by a computer, without human intervention.

In addition to providing an estimate of the error in velocity, the technique in accordance with the present invention also provides a value associated with the estimated error in the selected zero offset time $t_0$, also as a function of $G_1$ and $G_2$, or solely in accordance with the value of the $G_c$. The relationships which yield the $t_0$ error are also provided in Appendix I.

After having calculated the estimated velocity error in processor 22, this error can be used to update the stacking velocity to a value more closely approximating the actual velocity. The velocity error can be checked at decision processor 24 to see whether it is within a predefined tolerance for the stacking velocity. If the initial velocity estimate is already within the predetermined tolerance, no further work need be done for the event under examination. However, if the velocity error is greater than the predetermined tolerance, the velocity error is fed back to the velocity store and calculator 12 to provide an updated velocity value. The updated velocity is applied from the velocity store and calculator 12 to the summation processor 20 whereupon a new pair of weighted sums, or their crosscorrelation, are produced in accordance with the new velocity, and the new velocity error can be checked, as described above, to see whether it is within the predetermined tolerance. In this iterative manner, it has been found that the updated velocity will rapidly converge to within good tolerances, with real data. The number of iterations required for convergence depends upon the closeness of the initial velocity estimate to the actual velocity, the signal-to-noise ratio of the seismic data, and the weighting schemes employed in the error processor 22, as explained below.

Figure 8:
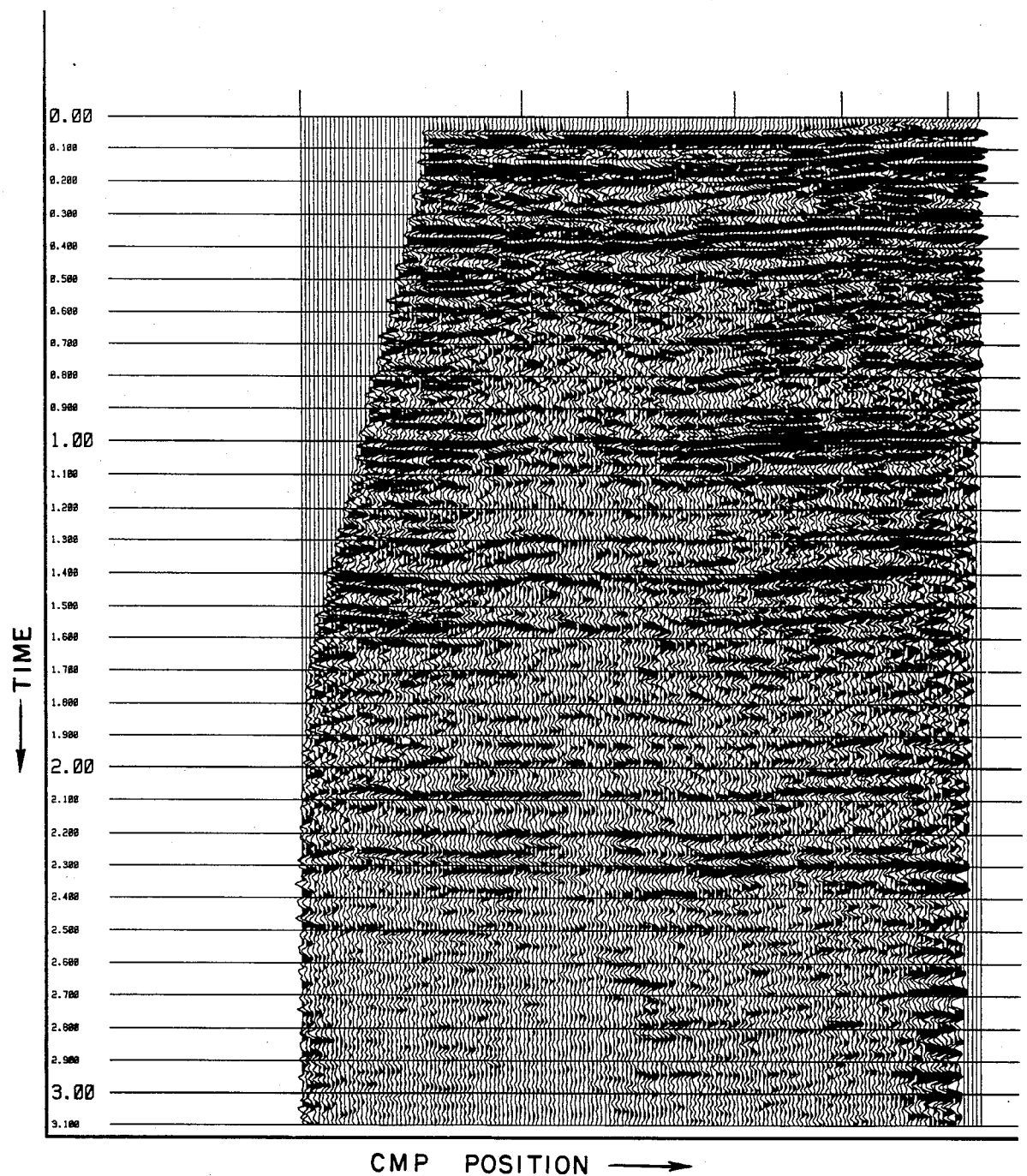
FIG. 8 is an illustration of a set of enhanced common midpoint stacks which are based on velocities calculated to be within a close tolerance of the actual velocity.

After having determined the velocity to within a predetermined tolerance, corresponding to a particular event in a particular midpoint gather, a similar process can be performed on other events of interest within the same or different gathers, to thereby develop a set of velocities each corresponding to a particular event. The common midpoint data can be re-stacked in stack processor 14 using the updated velocities and the result delivered to the graphics apparatus 16, to portray the seismic events using the highly accurate stacking velocities, thereby enhancing the representation of those events. FIG. 8 is an illustration of one such set of common midpoint stacks using velocities determined to be within 5 to 15 meters per second of the actual velocities, in accordance with the teachings herein. The enhancement of the pictorial representations of the events over that of FIG. 6 will be apparent to those skilled in the art.

As noted above, the error processor 22 can also provide an indication of the error in the zero offset travel time $t_0$, and such error signal can be used to revise the zero offset travel time used by summation processor 20 and by stack processor 14. Under normal circumstances, $t_0$ will already be accurately determined by a visual inspection of the initial stack using the initial velocity estimate, and accordingly the value of $G_1$ will ordinarily be small. However, the use of the $t_0$ updating technique can be useful where, for example, old common midpoint data are being used and there is some ambiguity as to the time axis used in collecting the data.

Figure 9:
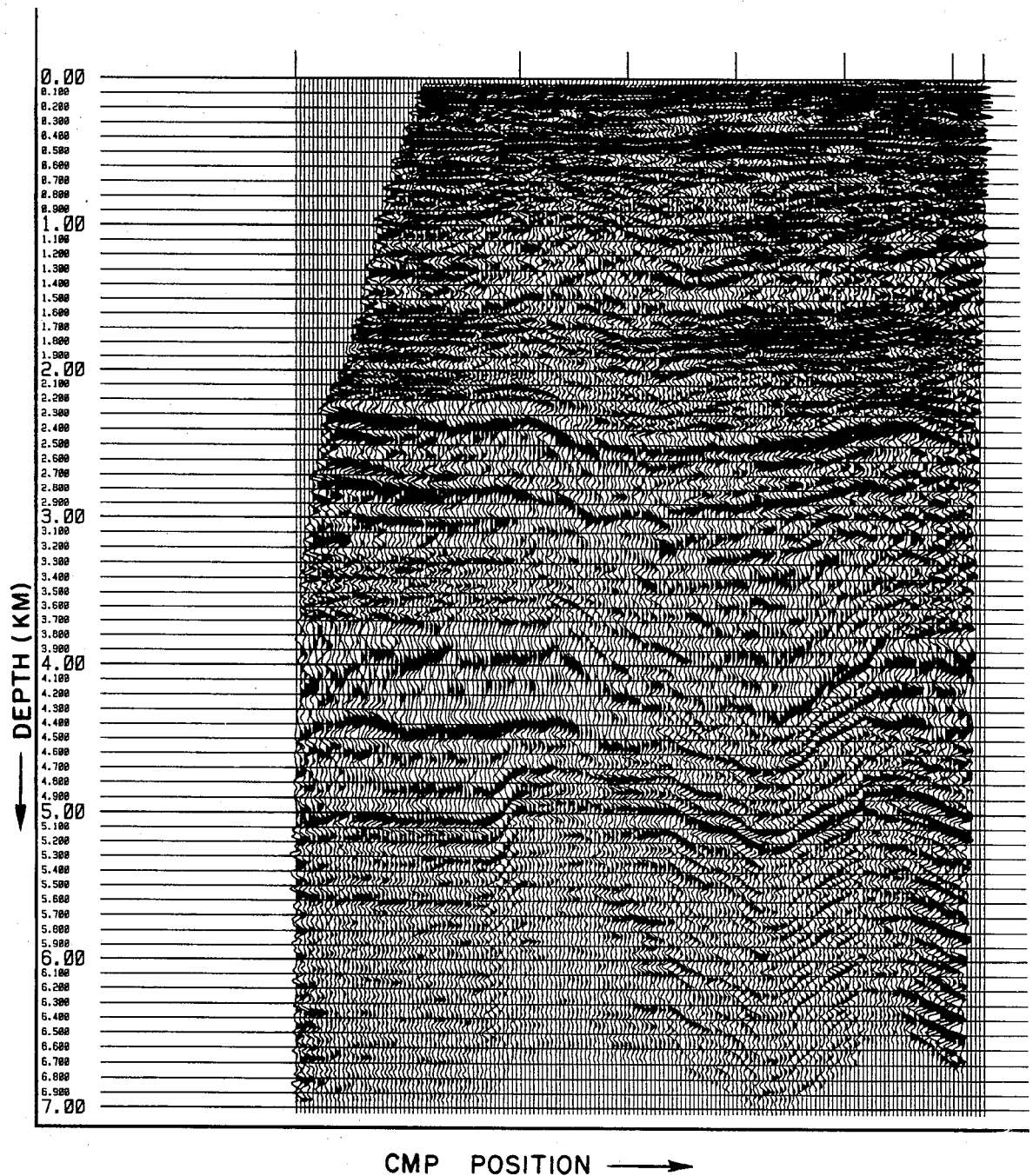
FIG. 9 is an example of a set of common midpoint stacks with the time axis converted to depth, in accordance with the calculated velocities.

In addition to providing more accurately portrayed events along the time axis, the events can be portrayed along a depth axis, by converting the "stacking" or "apparent RMS" velocities, as determined above, into "true interval" velocities versus depth, or "true average" velocities versus time, in velocity converter 27. The converted velocity for each event, from converter 27, the corrected stack from stack processor 14, and optionally the updated zero offset travel time, are then applied to a stack converter 26, which converts each zero-offset trace from a time to distance axis, to thereby portray each event substantially at its actual vertical location. The output of the stack converter 26 is applied to the graphics apparatus 16 to produce a visual representation of the events at their proper locations. An example of such visual representation is illustrated in FIG. 9.

A suitable technique for converting from stacking velocities to true interval or true average velocities in stack converter 27 is given in Appendix II, below, and in an article presented by J. W. C. Sherwood et al., at the 18th Annual Offshore Technology Conference, Houston, Tex., May 5–8, 1986, OTC Paper #5161, entitled "Depths and Interval Velocities From Seismic Reflection Data For Low Relief Structures", pp. 103–107, (and Figures appended thereto), the entire disclosure of which is hereby incorporated by reference.

Returning to FIG. 7, the size of the window centered upon $t_0$, over which the common midpoint data are summed should be large enough to contain at least one whole event, to thereby obtain a good signal-to-noise ratio, yet no so large as to be cluttered by a large number of events, which could hinder convergence to the true velocity, if different events within the window become confused for one another. However, under normal circumstances, the window can be large enough to include up to about three discrete events, with good results, and it has been found that a window of approximately 100 milliseconds is adequate in most cases.

Figure 10:
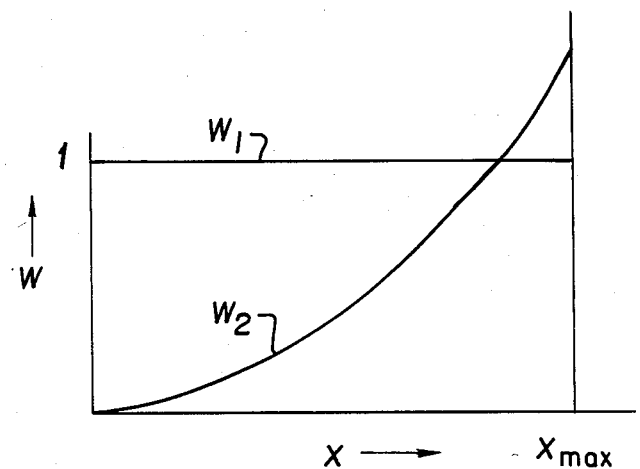
FIGS. 10–12 are graphical representations of weighting schemes which can be employed by the apparatus and method of the present invention.
Figure 11:
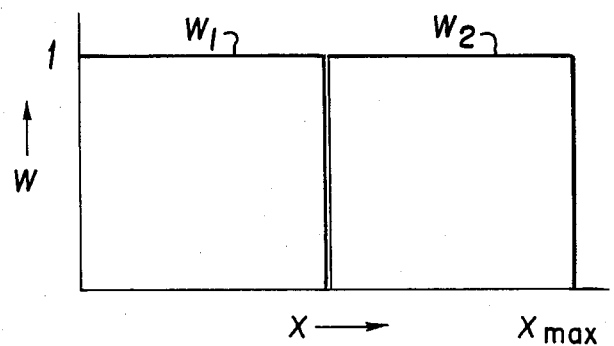
Figure 12:
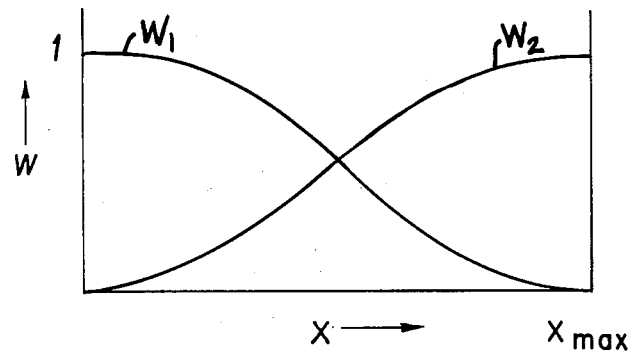

The rate at which the present technique converges to the true velocity is a function of the weights that are applied to the common midpoint data to produce the first and second weighted sums. With reference to FIGS. 10, 11 and 12 three different weighting schemes are illustrated. In FIG. 10, the first weight $W_1$, used to produce the first weighted sum, is unity, i.e. all signals within the common midpoint gather are weighted equally. The second weight, $W_2$, used to produced the second weighted sum, weights the signals within the common midpoint gather in accordance with the square of the offset. That is, the far-out offsets are weighted more heavily than the close-in offsets. This weighting scheme has been found to converge relatively slowly, but has a high immunity against confusion of different events within a single time window.

FIG. 11 illustrates another weighting scheme, whereby the first weight $W_1$, is defined as unity for offsets less than or equal to one-half the maximum offset, and zero for offsets greater than one-half the maximum offset. Conversely, the second weight $W_2$ is equal to unity for all offsets greater than one-half the maximum offset, and zero elsewhere. It has been found that this weighting scheme causes very rapid convergence, and is therefore very fast when implemented, but it is more subject to possible confusion between events within a single time window.

FIG. 12 represents a compromise between the weighting schemes of FIGS. 9 and 10, wherein the first weight $W_1$ is given by $$\tfrac{1}{2}(1+\cos(\pi(x-x_{min})/(x_{max}-x_{min}))),$$

where x equals offset, and the second weight is given by $1-W_1$. This weighting scheme is believed to converge rapidly while still maintaining significant immunity against confusion between events within a single window.

Although explained with reference to the discrete components illustrated in FIG. 5 to facilitate the explanation of the present invention, the invention readily lends itself to programmed implementation on a digital computer, and in order to facilitate an understanding of a computer implementation, a generalized program is provided below in Appendix III.

Thus, the present invention provides a technique for enhancing the representation of seismic events in a manner which is much more rapid and accurate than formerly possible. Because only those velocities needed to perform the iteration are used, the technique of the present invention will be faster than traditional techniques, and also more accurate since the common midpoint data are re-stacked at least once with a velocity within some tolerance of the true velocity, whereas in the traditional technique, an estimate of the true velocity is only obtained by interpolation. Also, in addition to being appreciably faster than techniques previously used, the present invention is more accurate and robust in the presence of seismic noise.

Various changes in variations to the present invention will occur to the skilled in the art in view of the foregoing description. It is intended that all such changes and variations be encompassed so long as the present invention is employed, as defined by the claims appearing below.

APPENDIX I

Seismic data for one particular event in a common midpoint gather has the following approximate form:

$$s(x,t)=f(t-t_x)$$

where $$t_x^2 = t_0^2 + x^2/v^2$$

The trajectory defined by the initial estimates of the time and velocity is given by:

$$(t_x')^2 = (t_0')^2 + x^2/v'^2$$

In the following $v'$ and $t_0'$ will be used to indicate initial velocity and zero offset time, and $v$ and $t_0$ to indicate true velocity and zero offset time. The true (or "observed") travel time will be denoted by $t_x$, and the trajectory by $t_x'$.

Two weighted stacks of the data over offset x are produced along the trajectory described above, using weights $W_1(x)$ and $W_2(x)$. Mathematically this is expressed by:

$$\sum_x W_1(x) s(x, t + t_x') = \sum_x W_1(x) f(t - t_x + t_x') \quad (1a)$$

$$\sum_x W_2(x) s(x, t + t_x') = \sum_x W_2(x) f(t - t_x + t_x') \quad (1b)$$

To simplify the notation, $t'$ is defined as $t + t_x'$ and $\Delta t_x$ as $t_x + t_x'$. By means of a Taylor series expansion of $f(t - t_x + t_x')$ in terms of $f(t)$, the above equations can be simplified. The Taylor series expansion is given by:

$$f(t - \Delta t_x) = f(t) - (df(t)/dt) \cdot \Delta t_x + \text{higher order terms} \quad (2)$$

Dropping the higher order terms and placing Eq. 2 into Eqs. 1a and 1b gives the following:

$$\sum_x W_1(x) s(x, t') = \sum_x W_1(x) f(t) - \sum_x (df(t)/dt) \cdot W_1(x) \Delta t_x \quad (3a)$$

$$\sum_x W_2(x) s(x, t') = \sum_x W_2(x) f(t) - \sum_x (df(t)/dt) \cdot W_2(x) \Delta t_x \quad (3b)$$

Since neither $f(t)$ nor $df(t)/dt$ are functions of x, they can be taken out of the summations, since the summations are over x. Letting $Q_1$ and $Q_2$ be the sums over x of the first and second weighting functions, the following results:

$$\sum_x W_1(x) s(x, t') = Q_1 \left( f(t) - \frac{df(t)}{dt} \cdot \frac{1}{Q_1} \sum_x W_1(x) \Delta t_x \right) \quad (4a)$$

$$\sum_x W_2(x) s(x, t') = Q_2 \left( f(t) - \frac{df(t)}{dt} \cdot \frac{1}{Q_2} \sum_x W_1(x) \Delta t_x \right) \quad (4b)$$

Note that equations 4a and 4b are themselves Taylor series expansions to the first order of the following:

$$\sum_x W_1(x) s(x, t') = Q_1 f\left( t - (1/Q_1) \sum_x W_1(x) \Delta t_x \right) \quad (5a)$$

$$\sum_x W_2(x) s(x, t') = Q_2 f\left( t - (1/Q_2) \sum_x W_2(x) \Delta t_x \right) \quad (5b)$$

Just as picking $f(t - t_x)$ gives $t_x$, picking 5a will give $$\sum_x W_1(x) \Delta t_x / Q_1$$

and picking 5b will give $$\sum_x W_2(x) \Delta t_x / Q_2.$$

The values of these picks will be called G1 and G2. Therefore:

$$G1 = (1/Q_1) \sum_x W_1(x) \Delta t_x \quad (6a)$$

$$G2 = (1/Q_2) \sum_x W_2(x) \Delta t_x \quad (6b)$$

To obtain the updating formula, $\Delta t_x$ must be given in terms of update velocity and time. Note that $\Delta t_x$, equal to $t_x - t_x'$, is a function of the initial and true velocity and time. Now $t_x$ can be related to $t_x'$ via a Taylor series expansion (again dropping higher order terms):

$$t_x = t_x' + (dt_x'/dw) \cdot (w - w') + (dt_x'/dt_0) \cdot (t_0 - t_0') \quad (7)$$

Here w has been used instead of v, where w is equal to $1/v$, and is known as "slowness" in the art.

From the equation for the trajectory, these derivatives can be computed and are:

$$(dt_x')/(dw) = x^2/(t_x' v')$$

and $$(dt_x')/(dt_0) = t_0'/t_x'$$

With these values for the derivatives and by placing Eq. 7 into Eqs. 6a and 6b, the following is obtained:

$$G1 = \frac{1}{Q_1} \sum_x W_1(x) \left\{ \frac{x^2}{t_x' v'} (w - w') + \frac{t_0'}{t_x'} (t_0 - t_0') \right\} \quad (8a)$$

$$G2 = \frac{1}{Q_2} \sum_x W_2(x) \left\{ \frac{x^2}{t_x' v'} (w - w') + \frac{t_0'}{t_x'} (t_0 - t_0') \right\} \quad (8b)$$

Since neither $(w - w')$ nor $(t_0 - t_0'')$ are functions of x, they can be taken out of the summation. Doing this results in:

$$Q_1 G1 = \quad (9a)$$

$$((w - w')/v') \sum_x W_1(x) x^2/t_x' + (t_0 - t_0') \sum_x W_1(x) t_0'/t_x'$$

$$Q_2 G2 = \quad (9b)$$

$$((w - w')/v') \sum_x W_2(x) x^2/t_x' + (t_0 - t_0') \sum_x W_2(x) t_0'/t_x'$$

Introducing the notation $X1 = \Sigma W_1(x) x^2/t_x'$, $X2 = \Sigma W_2(X) x^2/t_x'$, $T1 = \Sigma W_1(X) t_0'/t_x'$, and $T2 = \Sigma W_2(X) t_0'/t_x'$, results in:

$$Q1 \cdot G1 = X1(w - w')/v' + T1(t_0 - t_0') \quad (10a)$$

$$Q2 \cdot G2 = X2(w - w')/v' + T2(t_0 - t_0') \quad (10b)$$

This equation can be inverted and solved to give the updates in terms of known and calculable parameters:

$$(w - w')/v' = (T1 \cdot Q2 \cdot G2 - T2 \cdot Q1 \cdot G1)/D \quad (11a)$$

$$(t_0 - t_0') = (X2 \cdot Q1 \cdot G1 - X1 \cdot Q2 \cdot G2)/D \quad (11b)$$

where $D = T1 \cdot X2 - T2 \cdot X1$

These are the updating equations that are used when the cross-correlation technique is not used.

For the crosscorrelation method, the two weighed stacks given by Eqs. 5a and 5b are crosscorrelated:

$$\left\{ \sum_x W_1(x) s(x,t') \right\} \oplus \left\{ \sum_x W_2(x) s(x,t') \right\} = \quad (12)$$

$$NQ |f(t - G1 + G2)|^2$$

where $\oplus$ represents the crosscorrelation operation. The mathematical definition of crosscorrelation is:

$$H(t) \oplus J(t) = \sum_{t'} H(t') J(t' + t).$$

Picking 12 results in G1−G2, which will be called $G_c$.

$$G_c = G1 - G2 \left( \frac{X1}{Q1} - \frac{X2}{Q2} \right) \left( \frac{w - w'}{v} \right) + \quad (13)$$

$$\left( \frac{T1}{Q1} - \frac{T2}{Q2} \right) (t_0 - t_0')$$

Equation 13 results from subtracting Eq. 10b from Eq. 10a after first dividing by $Q_1$ and $Q_2$.

Since two equations have been combined, there are now two unknowns by only one equation; for a solution, another equation must be supplied. It will be assumed that:

$$\Sigma \Delta t_x = 0 \quad (14)$$

This assumes that the initial time estimate, $t_0'$ was taken from an initial stack formed using the initial velocity estimate.

Defining $$X0 = \sum_x x^2 / t_x$$

and $$T0 = \sum_x t_0' / t_x',$$

and from Eqs. 14 and 7:

$$0 = X0 \cdot \left( \frac{w - w'}{v'} \right) + T0 \cdot (t_0 - t_0') \quad (15)$$

Eqs. 15 and 13 can be inverted to give:

$$\frac{w - w'}{v'} = -T_0 G_c / D \quad (18a)$$

$$t_0 - t_0' = X_0 G_c / D \quad (18b)$$

where

-continued $$D = X0 \cdot \left( \frac{T1}{Q1} - \frac{T2}{Q2} \right) + T0 \cdot \left( \frac{X2}{Q2} - \frac{X1}{Q1} \right)$$

Equations 18a and 18b are the updating relationships used when the crosscorrelation technique is used.

APPENDIX II

This appendix gives a general method of converting from stacking velocities (Vrms) versus time, to interval velocities (Vint) versus depth.

PART 1 Convert Vrms$^2$, and to, to tx:

$$tx = \sqrt{to^2 + X^2 / V^2 \text{rms}}$$

tx is a function of common midpoint (y), and offset (X) as well as layer.

PART 2 Develop a relationship between Vint, z and tx (known as ray-tracing). This relationship gives tx for known Vint, z values. Therefore this relationship must be inverted.

$$tx = R(Vint, z) \quad (1)$$

PART 3 Invert the relationship.

In general, R is non-analytical and difficult to invert. Therefore, an approximation to R (R') is used instead:

$$tx = R(Vint, z)$$

$$tx' = R(V'int, z')$$

where V'int, z' are initial estimates of Vint, z.

Therefore, $tx - tx' = R(Vint, z) - R(V'int, z)$ which equals $R'(Vint - V'int, z - z')$, where Vint, z are updated estimates for Vint, z. R' is an invertible approximation for R.

thus:

$$(Vint - V'int, z - z') = (R'^T R')^{-1} R'^T (tx - t'x) \quad (2)$$

PART 4 Iteration: Vint becomes V'int, z becomes z' and Eq. 1 is used to generate a new t'x. New Vint and z are obtained from Eq. 2.

The process is repeated until (Vint−V'int) and (z−z') falls below a predetermined amount (say 0.005 z'int or 0.005 Vint'initial).

The exact form of R' can be determined in accordance with principles known in the art, such as those discussed in the above-identified article by Sherwood et al.

APPENDIX III

This appendix presents the generalized or "pseudo" code of that portion of the invention in which velocity is analyzed. The remaining portions of the invention, such as stacking and depth conversion use wellknown code and are therefore not presented here.

Definitions (a) constants

NCMP is the number of common midpoint (CMP) gathers to be analyzed
NVEL is the number of layers to be analyzed per CMP gather
NSAMP is the number of time samples per trace
NTR is the number of traces per CMP gather
DT is the interval between time samples in milliseconds NITERS is the maximum number of iterations to perform TOLV is the fractional tolerance for convergence to occur NDOM is the number (odd) of samples defining the width of the time window (b) arrays Traces is a 2-D array containing all the traces and samples of a single CMP gather RANGES is a 1-D array consisting the shot-receiver distances of the CMP gather to be analyzed WT1 is a 1-D array containing the first weights to be applied to the data WT2 is a 1-D array containing the second weights to be applied to the data VP is a 2-D array containing the initial estimates of velocity for all CMP locations and layers TOP is a 2-D array containing the initial estimates of zero offset travel time for all layers and CMP locations V is a 2-D array containing the final estimates of velocity for all CMP locations and layers T is a 2-D array containing the final estimates of zero offset travel time for all layers and CMP locations The rest of the constants and arrays are implicitly defined by their usage is the pseudo code

---

COPYRIGHT © 1987 ARAMCO
ALL RIGHTS RESERVED

```
c
c       start of the code:
c
        DO ICMP = 1,NCMP
c       get a new CMP gather:
        CALL INPUT (TRACES,NTR,NSAMP,RANGES)
        DO IVEL = 1,NVEL
c       start new layer. Set up starting velocity and time, and
c       calculate tolerance:
        TSTART = TOP(IVEL,ICMP)
        VSTART = VP(INVEL,ICMP)
        TOVLI = TOLV*VSTART
        DO ITER = 1,NITERS
c       calculate weighted stacks (S1 & S2) and various parameters
        (T0, T1, T2, X0, X1, X2, Q1 & Q2):
        CALL GENWTS(TRACES,TSTART,VSTART,NTR,
        NSAMP,
        *NDOM,DT,WT1,WT2,S1,S2,T0,T1,T2,X0,X1,X2,
        Q1,Q2)
c       cross correlate S1 and S2 to get XC:
        CALL CROSSC(S1,S2,XC,NDOM)
c       pick XC to get PICKT:
        CALL PICK(XC,PICKT,NDOM)
c       calculate new velocity and time:
        CALL VELUP(VNEW,TNEW,VSTART,TSTART,
        PICKT,T0,
        *    T1,T2,X0,X1,X2,W1,W2)
c       check to see if convergence has occurred:
        IF(ABS(VSTART-VNEW).LT.TOLV1) GO TO FINV:
c       convergence has not occured. Replace old estimates with
        new ones and repeat process:
        VSTART = VNEW
        TSTART = TNEW
        END DO ITER
c       convergence has occurred. Record the new velocities and
        start on new analysis location:
FINV:   T0(IVEL,ICMP) = VNEW
        V(IVEL,ICMP) = TNEW
        END DO IVEL
        END DO ICMP
        END PROGRAM
c
c       subroutines (explanations or code):
c
(1)     SUBROUTINE INPUT(TRACES,NCMP,NSAMP,
        RANGES)
```

---

COPYRIGHT © 1987 ARAMCO
ALL RIGHTS RESERVED

```
        takes data from tape and places it into the 2-D array
        TRACES.
        takes shot receiver distance information and places it
        into 1-D array RANGES.
(2)     SUBROUTINE GENWTS(TRACES,TSTART,
        VSTART,NTR,
     *  NSAMP,NDOM,DT,WT1,WT2,S1,S2,T0,T1,T2,X0,
        X1,X2,Q1,Q2)
        shifts data from traces into S1 and S2 after applying
        weights calculates T0,T1,T2,X0,X1,X2,W1,W2
c       code of this subroutine:
        IDOM = NDOM/2
c       set initial values of S1 and S2 and other parameters to zero:
        DO I = 1,NDOM
        S1(I) = 0.0
        S2(I) = 0.0
        END DO I
        T0 = 0.0
        T1 = 0.0
        T2 = 0.0
        X0 = 0.0
        X1 = 0.0
        X2 = 0.0
        Q1 = 0.0
        Q2 = 0.0
c       iteratively calculate S1 and S2 and the other parameters:
        DO ITR = 1,NTR
        X = RANGES(ITR)
c       calculate trajectory:
        TSP = SQRT(TSTART**2 + (X/VSTART)**2)
        DLT = TSP/DT + 1
        T1 = TSP - IDOM
        T2 = T1 + NDOM - 1
        DO IT = T1,T2
        S1(IT) = S1(IT) + WT1(ITR)*SHIFT(TRACES
        (1,ITR),DLT)
        S2(IT) = S2(IT) + WT2(ITR)*SHIFT(TRACES
        (1,ITR),DLT)
        END DO IT
        T0 = T0 + TSTART/TSP
        T1 = T1 + WT1(ITR)*TSTART/TSP
        T2 = T2 + WT2(ITR)*TSTART/TSP
        X0 = X0 + X*X/TSP
        X1 = X1 + WT1(ITR)*X*X/TSP
        X2 = X2 + WT2(ITR)*X*X/TSP
        Q1 = Q1 + WT1(ITR)
        Q2 = Q2 + WT2(ITR)
        END DO ITR
        END SUBROUTINE
        SUBROUTINE SHIFT(TRACES,DLT)
        returns TRACES(DLT)
        because DLT is not an integer, interpolation between
        samples is usually necessary
        SUBROUTINE CROSSC(S1,S2,XC,NDOM)
        cross correlates S1 and S2 and places result into XC.
        S1, S2, and XC all contain NDOM samples
        SUBROUTINE PICK(XC,PICKT,NDOM)
        picks maximum amplitude of XC and puts PICKT equal
        to the time deviation of the peak from the center of
        the window
        SUBROUTINE VELUP(VNEW,TNEW,VSTART,
        TSTART,PICKT,
     *  T0,T1,T2,X0,X1,X2,Q1,Q2)
        using the mathematical relationships developed in
        Appendix I,
        VNEW and TNEW are obtained from VSTART,
        TSTART, PICKT,
        and the parameters T0,T1,T2,X0,X1,X2,Q1 and Q2.
c
c       this ends the psuedo code.
c
```

What is claimed is:

1. A method for stacking a plurality of seismic midpoint gathers to provide an enhanced pictorial representation of seismic events, comprising:

(a) providing a plurality of common midpoint gathers;

(b) estimating the propagation velocities corresponding to selected events associated with the common midpoint gathers;
(c) stacking the common midpoint gathers using the corresponding velocity estimates, to produce corresponding midpoint stacks;
(d) estimating the zero offset travel times associated with selected events in the midpoint stacks;
(e) summing the common midpoint gathers using first and second weights to provide respective first and second weighted sums over offset for each selected event, over a time window centered upon the associated estimate of zero offset travel time, and based upon the estimated propagation velocity for that event;
(f) approximating the error in the estimated propagation velocity, as a function of the first and second weighted sums, to thereby obtain an updated estimate of the propagation velocity for each selected event; and
(g) re-stacking the common midpoint gathers in accordance with the propagation velocity as determined for each associated event in step (f) above, to thereby provide an enhanced pictorial representation of the seismic events.

2. The method of claim 1 wherein the step of approximating the error in the estimated propagation velocity includes determining the deviation of the peak of the first weighted sum from the center of the time window relative to the deviation of the peak of the second weighted sum from the center of the time window.

3. The method of claim 1 wherein the step of approximating the error in the estimated propagation velocity includes the step of crosscorrelating the first and second weighted sums and determining the deviation of the peak of the crosscorrelated sums from the center of the time window.

4. The method of any one of claims 1-3 wherein the first weight is unity and the second weight is the square of the offset.

5. The method of any one of claims 1-3 wherein the first weight is equal to (i) unity for offsets less than or equal to one-half of the maximum offset, and (ii) zero for offsets greater than one-half the maximum offset, and the second weight is equal to $1-W_1$, where $W_1$ is the first weight.

6. The method of any one of the claims 1-3 wherein the first weight $W_1$ is given by $$\tfrac{1}{2}(1+\cos(\pi(x-x_{min})/(x_{max}-x_{min}))),$$

where x equals offset, and the second weight is given by $1-W_1$.

7. The method of any one of claims 1-3 further comprising converting the updated estimates of propagation velocity to estimated "true" velocities, and converting the re-stacked common midpoint gathers in accordance with the estimated true velocities, into pictorial representations of the seismic events at locations substantially corresponding to the actual spacial locations of the events.

8. The method of any one of the claims 1-3 wherein step (f), above, further comprises the step of approximating the error in the zero offset travel time as a function of the first and second weighted sums, to thereby obtain an updated estimate of the zero offset travel time for each selected event.

9. The method of claim 8 further comprising converting the updated estimates of propagation velocity to estimated "true" velocities, and converting the re-stacked common midpoint gathers, in accordance with the estimated true velocities and zero offset travel times, into pictorial representations of the seismic events at locations substantially corresponding to the actual spacial locations of the events.

10. A method for stacking a seismic midpoint gather to provide an enhanced pictorial representation of a seismic event, comprising:
(a) providing a common midpoint gather;
(b) determining the approximate propagation velocity corresponding to a selected event, based on the common midpoint gather, by summing the common midpoint gather using (i) an estimated velocity corresponding to the event, and (ii) first and second weights to provide respective first and second weighted sums over offset, and developing from the sums a velocity error value indicative of the approximate error between the estimated velocity and the actual velocity; and
(c) stacking the common midpoint gather in accordance with the determined propagation velocity to thereby provide an enhanced pictorial representation of the seismic event.

11. The method of claim 10 wherein the first and second weighted sums are taken over a time window centered upon an estimated zero offset travel time for the event.

12. The method of claim 11 wherein the first weight is unity and the second weight is the square of the offset.

13. The method of claim 11 wherein the first weight is equal to (i) unity for offsets less than or equal to one-half of the maximum offset, and (ii) zero for offsets greater than one-half the maximum offset,. and the second weight is equal to $1-W_1$, where $W_1$ is the first weight.

14. The method of claim 11 wherein the first weight $W_1$ is given by $$\tfrac{1}{2}(1+\cos(\pi(x-x_{min})/(x_{max}-x_{min}))),$$

where x equals offset, and the second weight is given by $1-W_1$.

15. The method of claim 11 wherein the velocity error value is determined as a function of the deviation of the peak of the first weighted sum from the center of the time window, relative to the deviation of the peak of the second weighted sum from the center of the time window.

16. The method of claim 15 wherein the velocity error value $V_{err}$ is determined by $$V_{err} = -V^3 Err/(V^2 Err + 1)$$

where
$Err = (T1\ Q2\ G2 - T2\ Q1\ G1)/D$
$D = T1\ X2 - T2\ X1$
G1 is the time deviation of the peak of the first weighted sum
G2 is the time deviation of the peak of the second weighted sum $$T1 = \sum_x W_1(x)\, t_0'/t_x'$$

$$T2 = \sum_x W_2(x)\, t_0'/t_x'$$

-continued $$X1 = \sum_x W_1(x) x^2/t_x'$$

$$X2 = \sum_x W_2(x) x^2/t_x'$$

$$Q1 = \sum_x W_1(x)$$

$$Q2 = \sum_x W_2(x)$$

$t_0'$ is the initial zero offset travel time estimate
$V'$ is the initial velocity estimate
$t_x' = \sqrt{t_0'^2 + x^2/V'^2}$, the trajectory
$W_1(x)$ and $W_2(x)$ are the two weighting functions
$x$ = offset distance (offset≡shot-receiver distance)
and $$\sum_x$$

denotes the sum over all offsets.

17. The method of claim 11 further comprising the step of cross-correlating the first and second weighted sums, whereby the velocity error value is determined as a function of the deviation of the peak of the crosscorrelated sums from the center of the time window.

18. The method of claim 17 wherein the velocity error $V_{err}$ is determined by $$V_{err} = -V^3 Err/(V^2 Err+1)$$

where
$$Err = -T0 \, G_c/D$$

$$D = X0\left(\frac{T1}{Q1} - \frac{T2}{Q2}\right) + T0\left(\frac{X2}{Q2} - \frac{X1}{Q1}\right)$$

$G_c$ is the time deviation of the peak of the cross correlation of the two weighted stacks $$T0 = \sum_x t_0'/t_x'$$

$$T1 = \sum_x W_1(x) t_0'/t_x'$$

$$T2 = \sum_x W_2(x) t_0'/t_x'$$

$$X0 = \sum_x x^2/t_x'$$

$$X1 = \sum_x W_1(x) x^2/t_x'$$

$$X2 = \sum_x W_2(x) x^2/t_x'$$

$$Q1 = \sum_x W_1(x)$$

$$Q2 = \sum_x W_2(x)$$

$t_0'$ is the initial zero offset travel time estimate
$V'$ is the initial velocity estimate
$t_x' = \sqrt{t_0'^2 + x^2/V'^2}$, the trajectory;
$x$ = offset or shot-receiver distance
$W_1(x)$ and $W_2(x)$ are the weighting functions
and $$\sum_x$$

denotes the sum over all offsets.

19. The method of any one of claims 11–18 wherein an updated zero offset travel time is determined by developing from the first and second sums a time error value indicative of the approximate error between the estimated zero offset travel time and the actual zero offset travel time.

20. The method of claim 19, wherein the time error value $t_{err}$ is determined by $$t_{err} = (X2 Q1 G1 - X2 Q2 G2)/D$$

where
D = T1 X2 − T2 X1
G1 is the time deviation of the peak of the first weighted sum
G2 is the time deviation of the peak of the second weighted sum $$T1 = \sum_x W_1(x) t_0'/t_x'$$

$$T2 = \sum_x W_2(x) t_0'/t_x'$$

$$X1 = \sum_x W_1(x) x^2/t_x'$$

$$X2 = \sum_x W_2(x) x^2/t_x'$$

$$Q1 = \sum_x W_1(x)$$

$$Q2 = \sum_x W_2(x)$$

$t_0'$ is the initial zero offset travel time estimate
$V'$ is the initial velocity estimate
$t_x' = \sqrt{t_0'^2 + x^2/V'^2}$, the trajectory;
$W_1(x)$ and $W_2(x)$ are the weighting functions
$x$ = offset (or shot-receiver distance)
and $$\sum_x$$

denotes the sum over all offsets.

21. The method of claim 19, wherein the time error value $t_{err}$ is determined by
$$t_{err} = X0 G_c/D$$

where
D = X0{(T1/Q1) − (T2/Q2)} + T0{(X2/Q2) − (X1/Q1)}

$G_c$ is the time deviation of the peak of the cross correlation of the two weighted stacks $$T0 = \sum_x t_0'/t_x'$$

$$T1 = \sum_x W_1(x) t_0'/t_x'$$

$$T2 = \sum_x W_2(x) t_0'/t_x'$$

$$X0 = \sum_x x^2/t_x'$$

-continued $$X1 = \sum_x W_1(x) \, x^2/t_x'$$

$$X2 = \sum_x W_2(x) \, x^2/t_x'$$

$$Q1 = \sum_x W_1(x)$$

$$Q2 = \sum_x W_2(x)$$

$t_0'$ is the initial zero offset travel time estimate
$V'$ is the initial velocity estimate
$t_x' = \sqrt{t_0'^2 + x^2/V'^2}$, the trajectory;
x=offset (or shot-receiver distance)
$W_1(x)$ and $W_2(x)$ are the weighting functions
and $$\sum_x$$

denotes the sum over all offsets.

22. The method of any one of claims 10–18 further comprising converting the determined propagation velocity to an estimated "true" velocity, and converting the re-stacked common midpoint gather, in accordance with the estimated true velocity, into a pictorial representation of the seismic event at a location substantially corresponding to the actual spacial location of the event.

23. The method of claim 19 further comprising converting the re-stacked common midpoint gather, in accordance with the determined propagation velocity and updated zero offset time, into a pictorial representation of the seismic event at a location substantially corresponding to the actual spacial location of the event.

24. Apparatus for stacking a plurality of seismic midpoint gathers to provide an enhanced pictorial representation of a seismic event, comprising:
   a stack processor for stacking a common midpoint gather which includes the event, using an estimated propagation velocity, to thereby estimate the zero offset travel time for the event;
   a summation processor for summing the common midpoint gather using first and second weights to provide respective first and second weighted sums over offset, using the estimated propagation velocity, over a time window centered upon the estimated zero offset travel time for the event;
   an error processor responsive to the first and second weighted sums, for approximating the error in the estimated propagation velocity to thereby obtain an updated estimate of the propagation velocity; and
   feedback means for applying the updated estimate of the propagation velocity to the stack processing means to thereby re-stack the common midpoint gather in accordance therewith, to thereby provide an enhanced pictorial representation of the seismic event.

25. The apparatus of claim 24, further including means for checking to see whether the approximate error in propagation velocity is greater than a predetermined tolerance, and if so, for applying the updated estimate of propagation velocity to the summation processor to produce third and fourth weighted sums, and for applying the third and fourth sums to the error processor, to thereby provide a further updated estimate of propagation velocity, for application to the stack processor.

26. The apparatus of claim 24, wherein the summation processor sums the common midpoint gather using unity as the first weight, and the square of the offset as the second weight.

27. The apparatus of claim 24 wherein the summation processor sums the common midpoint gather using as the first weight $W_1$, defined as (i) unity for offsets less than or equal to one-half of the maximum offset and (ii) zero for offsets greater than one-half the maximum offset, and using the second weight a quantity equal to $1-W_1$.

28. The apparatus of claim 24 wherein the summation processor sums the common midpoint gather using as the first weight a quantity $W_1$ equal to
   $\frac{1}{2}(1+\cos(\pi(x-x_{min})/(x_{max}-x_{min})))$, where x equals offset, and the second weight is given by $1-W_1$.

29. The apparatus of claim 24 wherein the error processor includes means for determining the deviation of the peak of the first weighted sum from the center of the time window, relative to the deviation of the peak of the second weighted sum from the center of the time window.

30. The apparatus of claim 24, wherein the error processor includes means for crosscorrelating the first and second weighted sums, and means for determining the deviation of the peak of the crosscorrelated sums from the sum of the time window.

31. The apparatus of any one of claims 24–30 wherein the error processor also approximates the error in the estimated zero offset travel time to provide an updated zero offset travel time, and the feedback means also applies the updated zero offset travel time to the stack processor to thereby re-stack the common midpoint gather in accordance therewith.

32. The apparatus of any one of claims 24–30 further comprising means for converting the re-stacked common midpoint gather, in accordance with the updated propagation velocity, into a pictorial representation of the seismic event at a location substantially corresponding to the actual spacial location of the event.

33. The apparatus of claim 31, further comprising means for converting the updated estimate of propagation velocity to an estimated "true" velocity, and means for converting the re-stacked common midpoint gather, in accordance with the estimated true velocity and zero offset travel time, into a pictorial representation of the seismic event at a location substantially corresponding to the actual spacial location of the event.

34. Apparatus for stacking a plurality of seismic midpoint gathers to provide an enhanced pictorial representation of a seismic event, comprising;
   a summation processor for producing first and second weighted sums over offset of a common midpoint gather which includes the event, using an estimated propagation velocity;
   an error processor, responsive to the first and second weighted sums, for approximating the error in the estimated propagation velocity, to thereby obtain an updated estimate of the propagation velocity; and
   a stack processor for stacking the common midpoint gather in accordance with the updated estimate of the propagation velocity, to thereby provide an enhanced pictorial representation of the seismic event.

* * * * *

UNITED STATES PATENT AND TRADEMARK OFFICE
CERTIFICATE OF CORRECTION

PATENT NO. : 4,813,027

DATED : March 14, 1989

INVENTOR(S) : Hans Tieman

It is certified that error appears in the above-identified patent and that said Letters Patent is hereby corrected as shown below:

Col. 11, line 35     "by" should read --but--

Col. 12, lines 40-46 Should read as follows:

$$(\hat{V}int - V'int, \hat{z} - z') = (R'^{T}R') - R'^{T}(tx - t'x)$$

PART 4 Iteration: $\hat{V}int$ becomes $V'int$, $\hat{z}$ becomes $z'$ and Eq. 1 is used to generate a new $t'x$. New $\hat{V}int$ and $\hat{z}$ are obtained from Eq. 2.

The process is repeated until $(\hat{V}int - V'int)$ and $(\hat{z} - z')$ falls below a predetermined amount (say 0.005 $z'int$ or 0.005 $Vint'$ initial).

Col. 13, line 9     "Traces" should read --TRACES--

Col. 13, line 11    "consisting" should read --containing--

UNITED STATES PATENT AND TRADEMARK OFFICE
CERTIFICATE OF CORRECTION

PATENT NO. : 4,813,027

DATED : March 14, 1989

INVENTOR(S) : Hans Tieman

It is certified that error appears in the above-identified patent and that said Letters Patent is hereby corrected as shown below:

| | |
|---|---|
| Col. 16, lines 3 | delete "." insert --,-- |
| Col. 16, line 35 | delete "." |
| Col. 16, line 41 | delete "." insert --,-- |
| Col. 17, line 65 | This equation should read as follows: $$t'_x = \sqrt{t_0'^2 + x^2/V'^2}$$ |
| Col. 19, line 65 | delete line through "summation pro-" |

Signed and Sealed this

Eighth Day of May, 1990

Attest:

HARRY F. MANBECK, JR.

*Attesting Officer*   *Commissioner of Patents and Trademarks*